United States Patent
Alleaume et al.

(10) Patent No.: US 10,747,307 B2
(45) Date of Patent: Aug. 18, 2020

(54) SELECTION OF AN OBJECT IN AN AUGMENTED OR VIRTUAL REALITY ENVIRONMENT

(71) Applicant: INTERDIGITAL CE PATENT HOLDINGS, Paris (FR)

(72) Inventors: Vincent Alleaume, Pace (FR); Pierrick Jouet, Rennes (FR); Matthieu Fradet, Chanteloup (FR)

(73) Assignee: InterDigital CE Patent Holdings, Paris (FR)

( * ) Notice: Subject to any disclaimer, the term of this patent is extended or adjusted under 35 U.S.C. 154(b) by 0 days.

(21) Appl. No.: 15/800,221

(22) Filed: Nov. 1, 2017

(65) Prior Publication Data
US 2018/0136721 A1    May 17, 2018

(30) Foreign Application Priority Data
Nov. 16, 2016 (EP) .................................... 16306497

(51) Int. Cl.
| | |
|---|---|
| G06T 19/00 | (2011.01) |
| G06F 3/01 | (2006.01) |
| G06K 9/00 | (2006.01) |
| G06F 3/0484 | (2013.01) |
| G02B 27/01 | (2006.01) |
| G09G 3/00 | (2006.01) |

(52) U.S. Cl.
CPC .......... *G06F 3/013* (2013.01); *G02B 27/017* (2013.01); *G06F 3/017* (2013.01); *G06F 3/04842* (2013.01); *G06K 9/00355* (2013.01); *G06K 9/00671* (2013.01); *G06T 19/006* (2013.01); *G06F 2203/0381* (2013.01); *G06T 2219/024* (2013.01); *G09G 3/003* (2013.01); *G09G 2320/0693* (2013.01)

(58) Field of Classification Search
None
See application file for complete search history.

(56) References Cited

U.S. PATENT DOCUMENTS

| | | | |
|---|---|---|---|
| 2003/0179202 A1* | 9/2003 | Saund | G06F 3/0481 345/442 |
| 2008/0030499 A1 | 2/2008 | Wanda et al. | |
| 2009/0079700 A1* | 3/2009 | Abernathy | G06F 3/04845 345/173 |
| 2009/0153288 A1* | 6/2009 | Hope | G06F 3/0482 340/3.1 |

(Continued)

FOREIGN PATENT DOCUMENTS

WO    WO2015026742    2/2015

OTHER PUBLICATIONS

U.S. Appl. No. 91/211,326, filed Aug. 18, 2015, Worley, III et al.

(Continued)

*Primary Examiner* — Martin Mushambo
(74) *Attorney, Agent, or Firm* — Invention Mine LLC (57) ABSTRACT

A method of selection of an object in an environment including a plurality of real and/or virtual objects is described. The environment being displayed to a user through a display device includes an assignment of a gesture path to each object of the plurality of objects and the gesture path includes a series of gestures to be performed by the user to select the object.

12 Claims, 4 Drawing Sheets

(56) References Cited

U.S. PATENT DOCUMENTS

| | | | |
|---|---|---|---|
| 2010/0241998 A1 | 9/2010 | Latta et al. | |
| 2010/0302015 A1* | 12/2010 | Kipman | G06F 3/011 340/407.1 |
| 2011/0118752 A1* | 5/2011 | Itkowitz | B25J 9/1689 606/130 |
| 2012/0013609 A1* | 1/2012 | Reponen | G06F 3/0346 345/419 |
| 2013/0083024 A1* | 4/2013 | Li | H04N 13/183 345/426 |
| 2013/0147836 A1* | 6/2013 | Small | G06F 3/011 345/633 |
| 2013/0181982 A1* | 7/2013 | Tasaki | B60K 35/00 345/419 |
| 2013/0328925 A1* | 12/2013 | Latta | G09G 3/003 345/633 |
| 2013/0345962 A1* | 12/2013 | van Os | G01C 21/3632 701/412 |
| 2014/0184587 A1* | 7/2014 | Park | G06T 19/00 345/419 |
| 2015/0029092 A1* | 1/2015 | Holz | G06F 3/017 345/156 |
| 2015/0091898 A1* | 4/2015 | Tanaka | G05B 19/4061 345/419 |
| 2015/0153833 A1* | 6/2015 | Pinault | G06F 3/011 345/156 |
| 2015/0199020 A1* | 7/2015 | Hatada | G06F 3/04812 345/158 |
| 2015/0212690 A1* | 7/2015 | Hsieh | G06F 3/04842 715/835 |
| 2015/0220970 A1* | 8/2015 | Greenzeiger | G06Q 30/0244 705/14.43 |
| 2015/0248166 A1* | 9/2015 | Mayanglambam | G06F 3/017 345/173 |
| 2015/0253125 A1* | 9/2015 | Pettersson | G01B 11/007 715/771 |
| 2016/0098138 A1* | 4/2016 | Park | G06F 3/0416 345/173 |
| 2016/0148558 A1* | 5/2016 | Ernst | G06F 1/1694 345/156 |
| 2016/0202875 A1* | 7/2016 | Lee | A61B 8/466 345/419 |
| 2016/0378327 A1* | 12/2016 | Schroeder | G06F 3/04883 715/863 |

OTHER PUBLICATIONS

Slambekova, D., "Gaze and Gesture Based Object Interaction in Virtual World", Project Report for Master of Science Degree in Computer Science, Rochester Institute of Technology, Rochester, New York, USA, May 2012, pp. 1-54.

* cited by examiner

PRIOR ART

SELECTION OF AN OBJECT IN AN AUGMENTED OR VIRTUAL REALITY ENVIRONMENT

REFERENCE TO RELATED EUROPEAN APPLICATION

This application claims priority from European Patent Application No. 16306497.5, entitled "SELECTION OF AN OBJECT IN AN AUGMENTED OR VIRTUAL REALITY ENVIRONMENT," filed on Nov. 16, 2016, the contents of which are hereby incorporated by reference in its entirety.

FIELD OF THE INVENTION

The present invention generally relates to the field of human-computer interaction. More particularly, the invention deals with user interaction with objects in an augmented or virtual reality environment including real objects and/or virtual objects.

Thus, the invention concerns a method of selection of an object in an environment and a corresponding selection device. It further concerns a computer program implementing the selection method of the invention.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Common user interaction with multimedia devices such as computers, smartphones and tablets usually rely on user inputs like keyboard events, mouse events and screen touch events such as pinch, zoom, touch, etc.

Other interactions are also becoming common like vocal and gestural commands, which are generally used as indirect triggers, as an analysis of a related context is usually required to engage the action expected by the user.

This context may be commonly related and possibly limited to the specific application currently used by the user. In this case, the considered context includes for example the recent queries made by the user or the last opened menu.

The context may also include the immediate user environment, such as the physical location of the user in a room and the items present in the room, as the user can perceive them through his naked eyes or using a see-through device or a head-mounted display (HMD). An example of a context including real objects in the immediate user environment is shown in FIG. 1.

Figure 1:
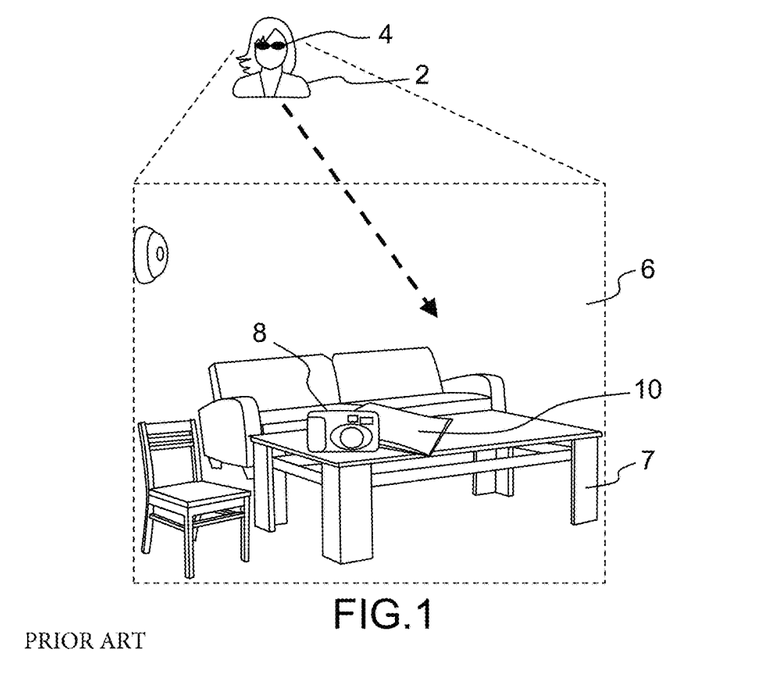
FIG. 1, already described, is a schematic view of an environment including only real objects.

In the example of FIG. 1, a user 2 equipped with a head-mounted display 4, can interact with a multitude of real objects located in a room 6. For instance, these objects include objects placed on a table 7, such as a camera 8 and a newspaper 10.

Moreover, in some cases such as altered reality or virtual reality applications, the context may include real and/or virtual object(s) from the surroundings of the user. An example of such context is shown in FIG. 2.

By altered reality, it is meant both the augmented reality (also called mixed reality) case i.e. real objects plus some virtual objects present in a scene and the case where real objects are altered, for example in size, color, presence, or location, as seen by the user either directly or by using a device such as see-through glasses.

Figure 2:
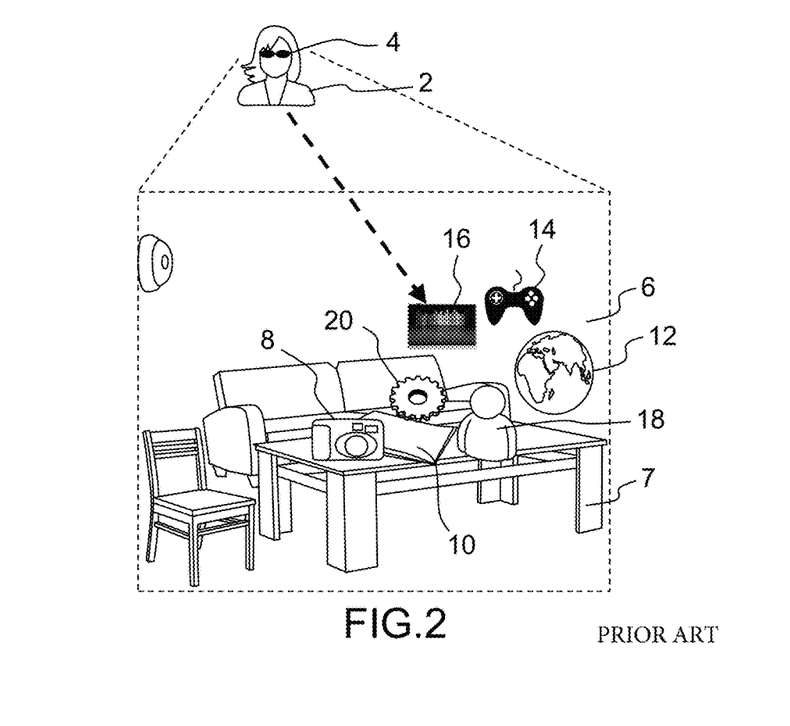
FIG. 2, already described, is a schematic view of an augmented reality environment including real and virtual objects.

In the example of FIG. 2, the user 2 equipped with the head-mounted display 4, can interact with the real objects 8, 10. The user 2 can also interact with virtual objects located in the room 6. For instance, the virtual objects include a globe 12, a gamepad 14, an equalizer 16, a character 18 and a gear 20. These virtual objects may be related to an application in the head-mounted display 4. For instance, the virtual objects may serve as an avatar of available applications, or avatars of elements that may be activated to trigger some related application, for example the gamepad 14 for a game launch.

In the case of multiple real and/or virtual objects in the immediate environment of the user, the user may need to specifically indicate the object that he intends to interact with. This selection of the object needs to be very accurate to avoid a misunderstanding of the user's intent by selecting a wrong object.

In common gaming approaches, such triggering of interaction is limited to a few objects at one time. The number of objects is usually linked to the number of buttons of the gamepad used by the player. Some games, for instance Heavy Rain Move Edition in Play Station 3 and Play Station 4 consoles, use a specific control device and a finely tuned layout of the objects in the play scene.

The document US2013/0328925 describes a system for interpreting user focus on virtual objects in a mixed reality environment. This system includes a see-through, head mounted display device coupled to one or more processing units. The processing units in cooperation with the head mounted display unit(s) can display one or more virtual objects, also referred to as holographic objects, to the user. The user may interact with the displayed virtual objects. Using inference, express gestures and heuristic rules, the system determines which of the virtual objects the user is likely focused on and interacting with. At that point, the system may emphasize the selected virtual object over other virtual objects, and interact with the selected virtual object in a variety of ways.

In this document, the selection of the object that the user wants to interact with is made by determining the position of the user's head or eyes or hand with respect to the virtual object or by determining the movement of the user's hand with respect to the virtual object.

One problem with the prior art solutions is that they do not manage accurately object selection in case of grouped objects in a close neighborhood. Also, the existing solutions cannot handle accurately a partial or a full overlap of real and/or virtual objects from the user viewpoint.

Figure 3:
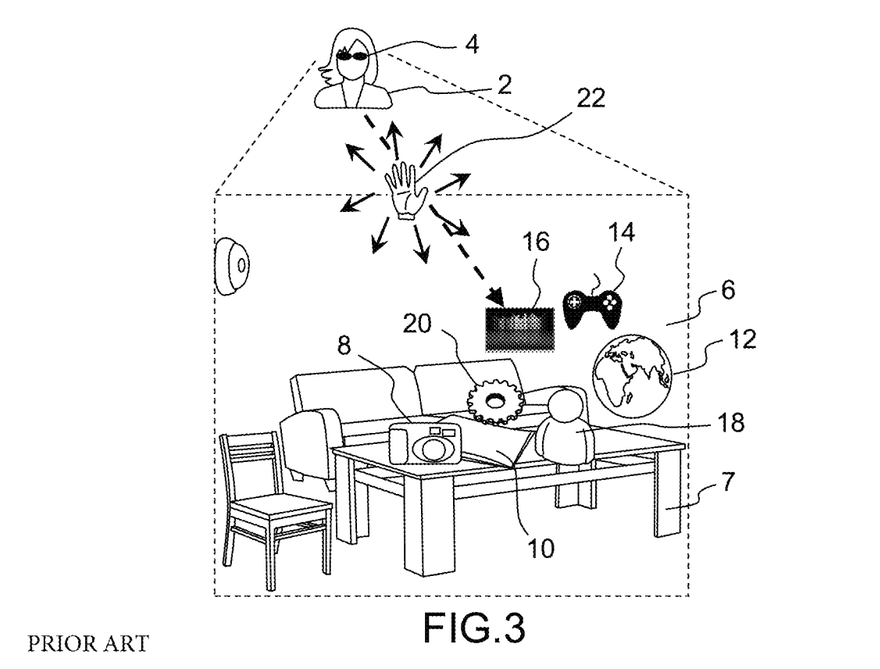
FIG. 3, already described, shows an example of an augmented reality environment including many objects close to each other.

FIG. 3 shows an example of a realistic augmented scene with numerous virtual object(s). Such scene would not be easily managed through existing systems.

The objects present in the scene of FIG. 3 are the same as those present in the scene of FIG. 2, with the camera 8 so close to the newspaper 10 that it covers it partially.

How would the user 2 be able to easily trigger some interaction, for instance by moving his/her hand 22, with a specific object in the scene of FIG. 3, such as the camera 8 or the newspaper 10 on the table 7, when they are so close, or even partially or fully occluding for instance?

SUMMARY OF THE INVENTION

The present invention proposes a solution for improving the situation.

Accordingly, the present invention provides a method of selection of an object in an environment including a plurality of real and/or virtual objects, the environment being displayed to a user through a display device, wherein the method includes an assignment of a gesture path to each object of the plurality of objects, the gesture path including a series of gestures to be performed by the user to select the object.

Thus, by the assignment of a gesture path uniquely distinguishing each object of the environment, it is possible to select any object even if it is partially or totally covered by another object from the user's viewpoint.

According to an embodiment, the method includes displaying the gesture path of each object as a tag superimposed on the object or near the object.

For instance, for an object which is visible from the user's viewpoint, the tag has a semi-transparent covering texture superimposed on the object. For an object that the user cannot see from his viewpoint, the tag is placed near the object in order to be visible. Alternatively, the occluding object is displayed with a semi-transparent texture and the tag is superimposed on the object so that it is semi-visible itself.

Advantageously, each gesture of the gesture path is displayed in the form of an arrow directed according to the gesture direction.

According to an embodiment, the method includes:
detecting a gesture performed by the user;
displaying the remaining gestures of the gesture path still to be performed to select the object.

Thus, the user knows, after each gesture, the remaining gestures still to be performed to select each object.

According to a first embodiment, the method includes:
detecting the objects for which a detected gesture of the user does not correspond to a first gesture of the remaining gestures to be accomplished;
discarding the detected objects.

Preferably, the detected objects are discarded by superimposing a tag in the form of a cross on the detected objects that become non-selectable by the user.

According to a second embodiment, the method includes:
detecting the objects for which a detected gesture of the user does not correspond to a first gesture of the remaining gestures to be accomplished;
changing the remaining gestures of the detected objects, wherein the remaining gestures of each object of the environment are different from the remaining gestures of any other object of the environment.

Thus, according to this second embodiment, even if the user erroneously performs a gesture not corresponding to the gesture path of the target object that the user wants to select, it is still possible to select this object as the corresponding gesture path is dynamically changed.

Advantageously, the object is selected when the gesture path assigned to the object has been completely accomplished.

According to an embodiment, the gestures are hand gestures.

This is advantageous as the directions of hand gestures are easy to detect.

Advantageously, the assignment of the gesture path takes into account the user's comfort.

For instance, the user's physical hand limitation is considered when determining the gestures to be accomplished to select an object.

The present invention also provides a selection device for selecting an object in an environment including a plurality of real and/or virtual objects, the environment being displayed to a user through a display, the selection device including at least one processor, wherein the selection device includes an assignment module configured to assign a gesture path to each object of the plurality of objects, the gesture path including a series of gestures to be performed by the user to select the object.

According to an embodiment, the assignment module is configured to:
detect the objects for which a detected gesture of the user does not correspond to a first gesture of the remaining gestures to be accomplished;
changing the remaining gestures of the detected objects, wherein the remaining gestures of each object of the environment are different from the remaining gestures of any other object of the environment.

According to an embodiment, the selection device includes an environment analysis module configured to analyze the environment and to detect the plurality of objects of the environment.

Advantageously, the environment analysis module is configured to detect partially or totally occulted objects from the user's viewpoint.

According to an embodiment, the selection device includes a gesture analysis module configured to analyze a gesture accomplished by the user.

The method according to the invention may be implemented in software on a programmable apparatus. It may be implemented solely in hardware or in software, or in a combination thereof.

Since the present invention can be implemented in software, the present invention can be embodied as computer readable code for provision to a programmable apparatus on any suitable carrier medium. A carrier medium may include a storage medium such as a floppy disk, a CD-ROM, a hard disk drive, a magnetic tape device or a solid state memory device and the like.

The invention thus provides a computer-readable program including computer-executable instructions to enable a computer to perform the selection method of the invention.

Figure 7:
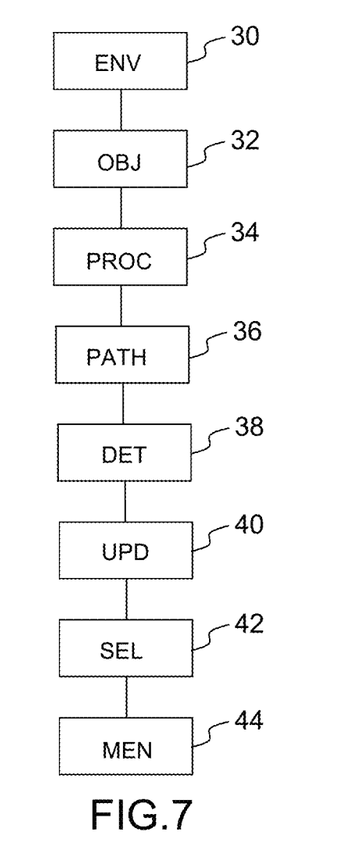
FIG. 7 is a flowchart showing the steps of the selection method according to an embodiment of the present invention.

The diagram of FIG. 7 illustrates an example of the general algorithm for such computer program.

BRIEF DESCRIPTION OF THE DRAWINGS

The present invention is illustrated by way of examples, and not by way of limitation, in the figures of the accompanying drawings, in which like reference numerals refer to similar elements and in which.

DETAILED DESCRIPTION OF PREFERRED EMBODIMENTS

The embodiments of the present invention are implemented in the augmented reality environment already described with reference to FIG. 3.

Figure 4:
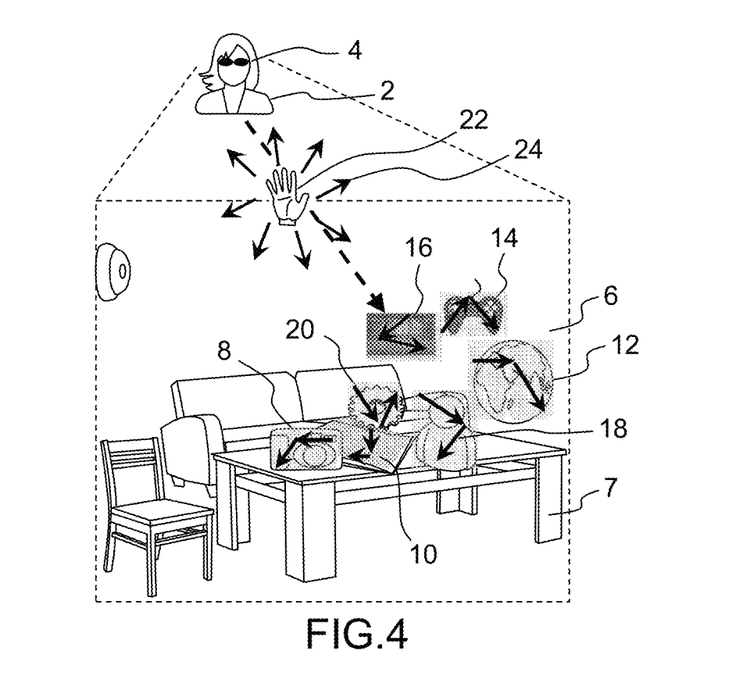
FIG. 4 shows an example of implementation of the present invention in the environment of FIG. 3.

This environment is also represented in FIG. 4. In this environment, the user 2 equipped with the head-mounted display 4, can interact with the real objects 8, 10. The user 2 can also interact with the virtual objects 12, 14, 16, 18, 20. For instance, these virtual objects may be related to an application in the head-mounted display 4, such as a game for example. The environment represented in FIG. 4, also called scene, corresponds to the field of view of the user 2 equipped with the head-mounted display 4.

Advantageously, the user 2 engages interaction with an object among the objects 8, 10, 12, 14, 16, 18, 20 by moving his/her hand 22. The hand 22 may be moved according to a plurality of movements represented by arrows 24.

In the following description, a gesture means a minimal movement of a body part, preferably the hand, in a 2D or 3D space, that is detectable by an analysis system in charge of user's commands detection. For instance, the user moves slightly his/her right hand from a still position by 4 cm to the right, then being still again. This could represent a gesture movement unit.

By gesture path, it is meant a combination, i.e. a temporal sequence, of unit gestures as defined above.

In a 2D space, typically defined around the user's hand current position, depth change of the hand is typically ignored, the depth being the distance from the hand to the observing device that estimates hand changes in time. Such observing device includes a sensing device such as a camera for instance.

In a 3D space, the change in depth location of the hand; with respect to the observing device, could also be taken into account, to allow additional unit gestures, such as for instance some "press" gesture (hand moves slightly closer to the observing device in charge of estimating hand gestures) or some "release" gesture (hand moves slightly away from that device).

The start and the end of a gesture (respectively gesture path) could be an absence of movement detected in the move estimation process. The end of a gesture could also be defined as a duration time threshold (a unit gesture could be set to be 3 seconds long at most, for instance), or a gesture path could be set as ended as soon as the cumulated gesture units do not belong to any of the known gestures (i.e. the gestures the system tries to recognize as commands).

Also, "hand" gestures include gestures made with any object being used as a controller, like a remote control for example.

Advantageously, in the represented embodiment, the gestures executed by the user's hand 22 are 2D gestures, i.e. gestures being in a planar region close to the user's hand 22.

According to another example, 3D gesture(s), in a bounding area around the hand 22 of the user 2 are also considered, still with respect to the hand physiological limitation or to the user's comfort requirement. Indeed, the hand 22 should stay close to its initial gesture start, and cannot move far away of the user's location for instance.

According to the embodiment shown on FIG. 4, while the selection of an object is engaged, each candidate object of the scene is temporarily rendered as being more or less partially tagged, for instance by using a semi-transparent covering texture. The tag, advantageously includes dynamic information, represented in the form of a series of arrows, displaying the remaining gestures that the user 2 needs to achieve to finally select each object. These remaining gestures provide a gesture path that the user 2 needs to achieve using the hand 22 in order to select the object.

For the intended selection purpose, the remaining gestures, constituting the gesture path at each moment, are built so as to be discriminative, i.e. no eligible objects from the scene have the same remaining gesture path presented at the same time, as shown in FIG. 4, where each of the objects of the scene has a gesture path different from the gesture paths of the other objects.

By the association of a gesture path with each object, all the objects of the environment can be selected even if they are not visible to the user 2, for instance because they are totally or partially hidden by other objects. In order to improve this possibility of selection of masked objects, the size of the semi-transparent textured object's overlay that serves to display its related gesture path may be reduced.

Figure 5:
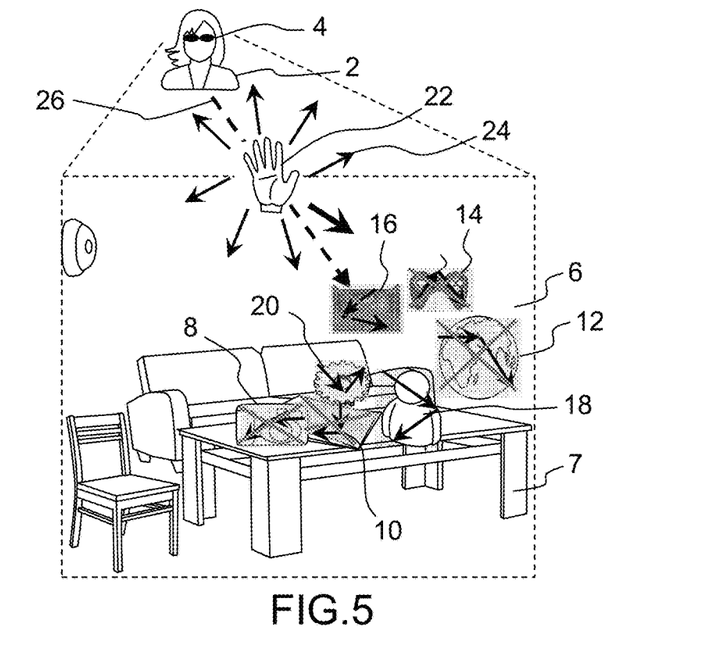
FIG. 5 shows an example of implementation of a first embodiment of the present invention in the environment of FIG. 3.

According to a first embodiment represented in FIG. 5, when the user 2 makes a gesture with the hand 22 that does not correspond to a first gesture of the remaining gestures to be accomplished for a given object, then this object is discarded from the selection, i.e. the user 2, can no more select this object.

For instance, as the user 2 has just moved the hand 22 according to the gesture represented by the arrow 26, which corresponds to the first gesture of the gesture path only of objects 18 and 20, all the other objects 8, 10, 12, 14, 16 are discarded from the selection.

This discarding is shown to the user 2, for instance by superimposing a tag in the form of a cross on the objects 8, 10, 12, 14, 16 that become non-selectable. It is also possible to show that an object is discarded by reducing its size.

This first embodiment is advantageous in order to achieve a quick selection of the desired object. However, this first embodiment is not error-tolerant. Indeed, the user 2 may be interested by selecting, for example, the gamepad 14 but unfortunately made a wrong gesture not corresponding to the first gesture of the remaining gesture path associated with this gamepad 14.

Advantageously, according to a second embodiment, it is still possible to select objects even after wrong gestures made by the user 2.

Figure 6:
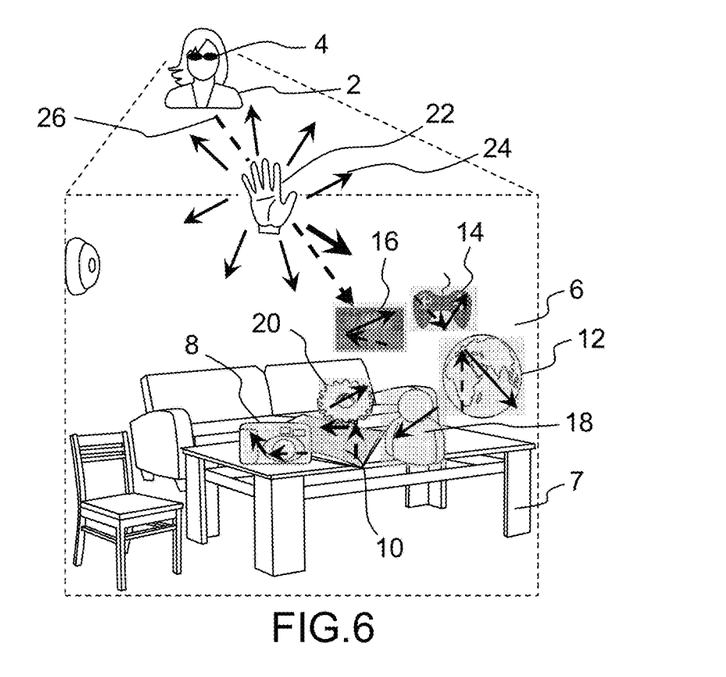
FIG. 6 shows an example of implementation of a second embodiment of the present invention in the environment of FIG. 3.

According to this second embodiment, represented in FIG. 6, when the user 2 makes a gesture that does not correspond to a first gesture of the remaining gestures to be accomplished for an object, the remaining gestures of this object are changed, while being still different from the remaining gestures of any other object of the environment. This second embodiment permits the recovery from any wrong gesture accomplished by the user 2.

Thus, instead of being discarded, as in the first embodiment, the objects 8, 10, 12, 14, 16 are still selectable but with a new gesture path.

It is important to note that only the gesture paths of objects 8, 10, 12, 14, 16 are changed. The gesture paths of objects 18, 20, for which the gesture of the user 2 matches with the first gesture of the gesture path, are unchanged. This is advantageous as the selection process remains the same for these objects and no extra selection time is faced by the user despite the activation of the recovery option according to the second embodiment.

In case of an erroneous gesture, the user 2 may still select the desired object without having to re-engage a full gesture detection, as described later with reference to FIG. 7. Thus, the second embodiment allows fixing a wrong gesture with a minimal cost regarding the time execution of the object selection.

The approach of the second embodiment of the invention results in a dynamic real-time update of each gesture path of each present but potentially discarded object.

Advantageously, the change of the gesture path may be signaled visually to the user 2 by any mean, for example by using a new red color or discontinuous arrows.

When there's a change of the gesture path, the physical hand limitation and the user's comfort are also considered. Thus, when a gesture path leads the hand 22 far from its initial position, or in an area potentially uncomfortable for the user 2, then the recalculated gesture path would favor a path leading back the user's hand 22 close to its initial position, or even to a more comfortable position, while keeping discriminative gesture paths for all the objects.

Also, advantageously, when only 2D gestures are considered and the user 2 makes a 3D gesture, the gesture paths are recalculated. Alternatively, the 2D plane orientation in which the user's gesture is evaluated may be first estimated from a first 3D gesture of the user in order to let the user define its preferred gesture area for instance.

The flowchart of FIG. 7 shows the steps of the method of selection of an object according to a preferred embodiment of the invention.

During a first step 30, the environment layout is estimated, preferably through a 3D scanning. This 3D scanning may include one of or a combination of the following steps:
depth sensing;
color stereo capture;
image features extraction, possibly completed by a database features extraction for example to extract features specific to the location and/or orientation of the user 2. A pre-learned database of known objects may be used in which objects are described through spatial/size features, color features, depth features, etc. to help estimate the layout of the user's environment. For instance, a database of chairs, sofas, tables, could be used for that purpose.

For example, the estimation may identify that the user 2 is in a specific room of the home and may recognize the related objects, for instance the sofa, the TV, the coffee table in a living room.

After the detection of the real objects, the virtual objects are added to the scene either in the same location, e.g. in the same room, or in another location, like another room.

At step 32, partial or total occultation of one or more objects of the environment is detected. This occultation is generally due to a partial or total covering between real and/or virtual objects.

Then, the detected occultation is processed at step 34 by altering the appearance of the objects presented to the user. For instance, fully occluding object(s), as seen from the point of view to the user, are visually arranged, by a semi-transparent overlay for example, to let some display allocation for each of these objects. For example, an object fully occluding two others may see its original view being split in three, and the two other objects will be allocated some display area inside the originally occluding object area. Semi-transparent and/or colored sub-areas in the rendered display in the user interface is a possible output of such occultation processing.

At step 36, a gesture path is assigned to each object that may be selected by the user, called selectable object. This gesture path is displayed on the head-mounted device 4 as a tag.

At step 38, a start of a gesture of the user is detected. Then, the gesture achievement is estimated.

At step 40, according to the second embodiment of the invention, when it is detected that the gesture does not match with one or more gesture path(s) of one or more object(s), the gesture path(s) is/are updated.

At step 42, when the user 2 has completed a gesture path of a given object, the object is selected.

A list of actions that the user can do using the selected objects is advantageously displayed to the user.

According to an embodiment, an audio feedback is implemented instead or in combination with the display.

The user can then choose the desired action. This action may be a User Interface action such as a zoom. It may also be a content play or any other action using the selected object.

At step 44, the desired action is executed.

Figure 8:
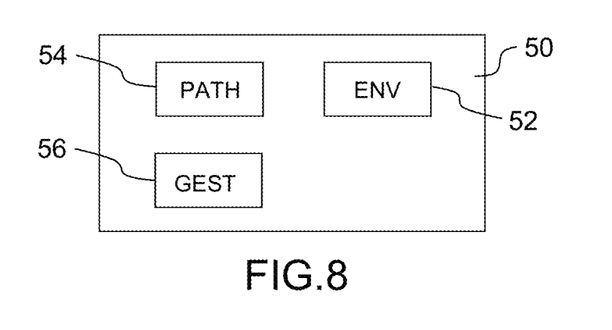
FIG. 8 is a schematic view illustrating the selection device, according to an embodiment of the invention.

FIG. 8 illustrates a selection device 50 according to an embodiment of the invention.

The selection device 50 is for instance the head-mounted display 4 itself, especially when the head-mounted display has sufficient processing power and sensing hardware capabilities. It may also be a PC, a smartphone, a set-top box, a gateway or any other device having one or more processors, a network connectivity and scene (3D) sensing capabilities.

The selection device 50 includes an environment analysis module 52. This environment analysis module 52 advantageously includes a 3D scene scanner.

The selection device 50 also includes an assignment module 54 configured to assign a gesture path to each selectable object detected by the environment analysis module 52. The assignment module 54 is configured to update the gesture paths when necessary, according to the second embodiment of the invention.

According to an embodiment, the selection device 50 includes a gesture analysis module 56 configured to analyze a gesture accomplished by the user 2. This gesture analysis module 56 is preferably configured to detect the user's hand 22 gestures in a plan (2D gestures).

The 3D scene scanning and the identification/tracking of the user's gestures may be done on visual clues estimation, such as images segmentation, for instance from a camera embedded in the head-mounted display 4 and/or spatially localized in the user's environment to allow accurate user's hand tracking and scene layout estimation.

Alternatively, the 3D scene scanning and the identification/tracking of the user's gestures may be implemented by 3D features extraction using a DEPTH Camera, based on pure depth sensing by Time-Of-Flight selection, or depth estimation from a projected pattern in InfraRed light, or a stereo vision camera, or a combination of the above.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention is not limited to the particular embodiments disclosed, but that the invention includes all embodiments falling within the scope of the appended claims.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed to be a reference to the plural and vice versa.

A person skilled in the art will readily appreciate that various parameters disclosed in the description may be modified and that various embodiments disclosed and/or claimed may be combined without departing from the scope of the invention.

The invention claimed is:

1. A method of selection of an object in an environment including a plurality of real and/or virtual objects, the environment being displayed to a user through a display device, wherein the method includes an assignment of a gesture path to each object of the plurality of objects, the gesture path including a series of gestures to be performed by the user to select the object, the method further including:
 detecting the objects for which a detected gesture of the user does not correspond to a first gesture of the remaining gestures to be accomplished; and
 changing the remaining gestures of the detected objects, wherein the remaining gestures of each object of the environment are different from the remaining gestures of any other object of the environment.

2. The method of claim 1, including displaying the gesture path of each object as a tag superimposed on the object or near the object.

3. The method of claim 1, including:
 detecting a gesture performed by the user;
 displaying the remaining gestures of the gesture path still to be performed to select the object.

4. The method of claim 1, wherein the gestures are hand gestures.

5. The method of claim 1, wherein the assignment of the gesture path takes into account the user's comfort.

6. A selection device for selecting an object in an environment including a plurality of real and/or virtual objects, the environment being displayed to a user through a display, the selection device including at least one processor, wherein the selection device includes an assignment module configured to assign a gesture path to each object of the plurality of objects, the gesture path including a series of gestures to be performed by the user to select the object, wherein the assignment module is configured to:
 detect the objects for which a detected gesture of the user does not correspond to a first gesture of the remaining gestures to be accomplished; and
 change the remaining gestures of the detected objects, wherein the remaining gestures of each object of the environment are different from the remaining gestures of any other object of the environment.

7. The selection device of claim 6, including an environment analysis module configured to analyze the environment and to detect the plurality of objects of the environment.

8. The selection device of claim 6, wherein the environment analysis module is configured to detect partially or totally occulted objects from the user's viewpoint.

9. The selection device of claim 6, including a gesture analysis module configured to analyze a gesture accomplished by the user.

10. A non-transitory computer-readable storage medium including computer-executable instructions to enable a computer to perform a method of selection of an object in an environment including a plurality of real and/or virtual objects, the environment being displayed to a user through a display device, wherein the method includes an assignment of a gesture path to each object of the plurality of objects, the gesture path including a series of gestures to be performed by the user to select the object, the method further including:
 detecting the objects for which a detected gesture of the user does not correspond to a first gesture of the remaining gestures to be accomplished; and
 changing the remaining gestures of the detected objects, wherein the remaining gestures of each object of the environment are different from the remaining gestures of any other object of the environment.

11. The method of claim 1, wherein each gesture of the gesture path is displayed in the form of an arrow directed according to the gesture direction.

12. The method of claim 1, wherein the object is selected when the gesture path assigned to the object has been completely accomplished.

* * * * *

UNITED STATES PATENT AND TRADEMARK OFFICE
CERTIFICATE OF CORRECTION

PATENT NO. : 10,747,307 B2
APPLICATION NO. : 15/800221
DATED : August 18, 2020
INVENTOR(S) : Vincent Alleaume, Pierrick Jouet and Matthieu Fradet It is certified that error appears in the above-identified patent and that said Letters Patent is hereby corrected as shown below:

In the Claims

Claim 1, Column 9, Line 25: delete "the" after "gesture of"

Claim 6, Column 10, Line 7: delete "the" after "gesture of"

Claim 10, Column 10, Line 33: delete "the" after "gesture of"

Signed and Sealed this
Thirtieth Day of August, 2022

Katherine Kelly Vidal
Director of the United States Patent and Trademark Office